Aug. 22, 1961 H. ZAHN 2,996,907
GAS CIGARETTE-LIGHTER
Filed April 28, 1959
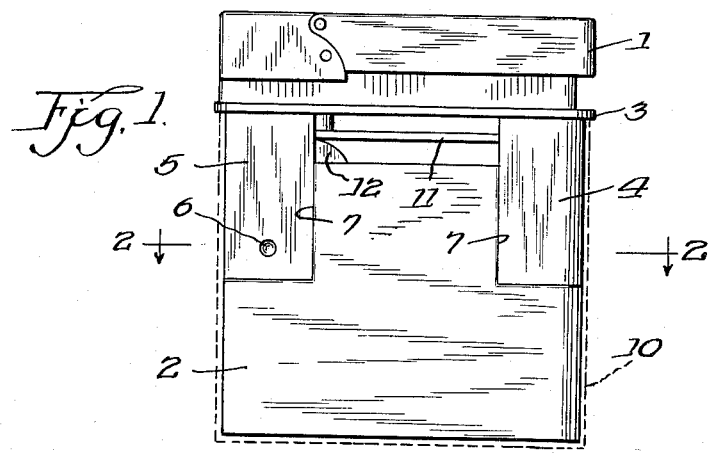
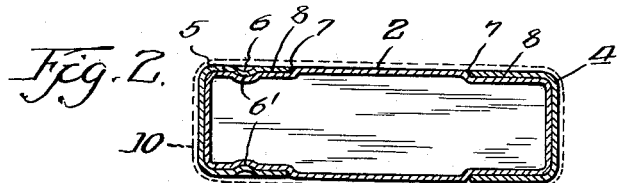
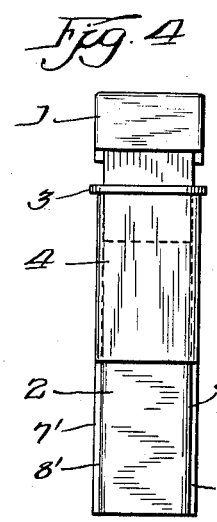 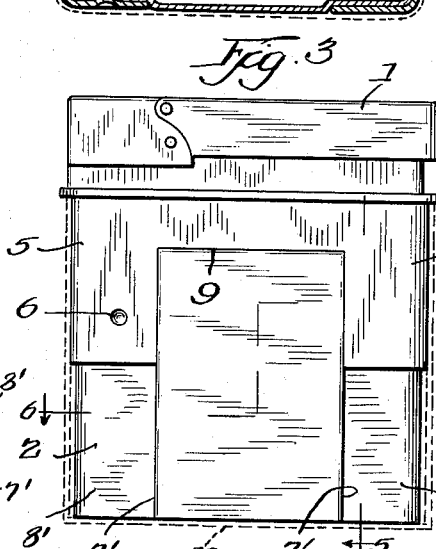 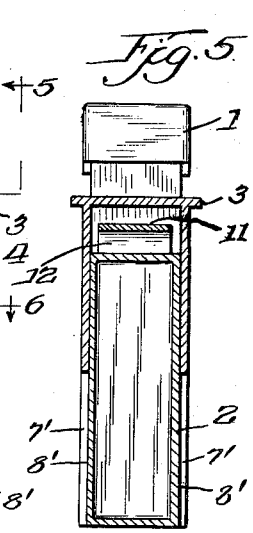
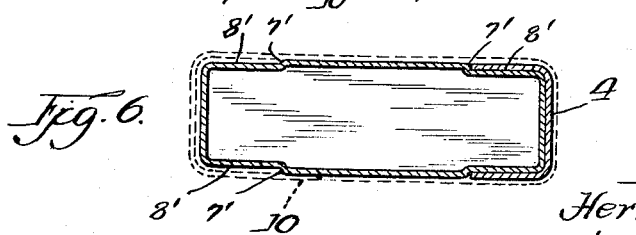
Inventor.
Hermann Zahn.

United States Patent Office 2,996,907
Patented Aug. 22, 1961

2,996,907
GAS CIGARETTE-LIGHTER
Hermann Zahn, Henselstrasse 5, Frankfurt
am Main, Germany
Filed Apr. 28, 1959, Ser. No. 809,468
Claims priority, application Germany May 3, 1958
5 Claims. (Cl. 67—7.1)

This invention is concerned with a gas cigarette lighter.

Gas cigarette lighters are known which are provided with a gas tank with an ignition mechanism mounted thereon, wherein, on actuation, a friction wheel runs over a flint and a stream of ignition sparks is formed which ignites the gas emerging from a gas valve on the gas tank. This ignition mechanism is combined with the gas tank in such a manner that both parts can be replaced.

The invention relates to a particularly advantageous and reliable connection between the ignition mechanism and the gas tank.

According to the invention, the ignition mechanism is mounted on a plug-in frame which is fitted onto the gas tank in an easily detachable manner in the desired relative position.

The type of construction and mode of operation of the ignition mechanism are immaterial. Fully automatic or semi-automatic devices may be provided or those in which separate, and if necessary separately actuated, means are provided for producing the stream of ignition sparks and for opening the gas valve on the gas tank.

The plug-in frame on the ignition mechanism is preferably constructed in such a manner that it only engages over the narrow sides of the gas tank which comprises suitably recessed or undercut portions at these areas into which fit the parts of the plug-in frame. In order to improve the locating, the plug-in frame and/or the gas tank may be equipped with releasable means for mutual locking, for example, small corrugations in the one part may engage in corresponding projections on the other part.

Apart from the permanent securing of the required relative position of the ignition mechanism and gas tank which is thus obtained, it is possible to obtain a larger volume of gas with the same cross-sectional conditions because only those parts of the gas tank against which the parts of the plug-in frame bear need to be recessed, in particular, by an amount corresponding to the thickness of the frame members. All the remaining parts may be made wider by this thickness of the frame members, which leads to a wider cross-section at these points and hence an enlargement of the capacity.

The depressions or recesses for the plug-in frame, formed on the gas tank, particularly by stamping, act as stiffening ribs. They increase the stability and compressive strength so that the material for the gas tank need only have a small cross-section. As a result, there is a saving in weight for the gas tank.

Two embodiments of the invention are illustrated by way of example in the drawing.

FIGURE 1 shows, in side elevation, in bold lines, a plug-in frame construction for the lighter mechanism which is fitted onto a gas tank;

FIGURE 2 is a sectional view taken approximately on the line of 2—2 of FIGURE 1;

FIGURE 3 shows, in side elevation, a modified construction of a plug-in frame for the ignition mechanism, fitted on a gas tank;

FIGURE 4 shows the side view, as seen from the right, of the device illustrated in FIGURE 3;

FIGURE 5 is a sectional view taken approximately on the line 5—5 of FIGURE 3; and FIGURE 6 is a sectional view taken approximately on the line 6—6 of FIGURE 3.

In both examples, the ignition mechanism, which does not form the subject of the invention, is designated by numeral 1 and the associated gas tank by numeral 2. The ignition mechanism is in each case carried by a plug-in frame 3 which is provided at the two narrow sides with arms 4 and 5 extending therefrom. These two arms 4 and 5 are of U-shaped cross-section as can clearly be seen from FIGURE 2.

In the form of plug-in frame shown in FIGURES 1 and 2, the two arms 4 and 5 fit precisely against the lateral edges and bottom edges of the recessed parallel side and end faces of the gas tank 2 so that the arms 4 and 5 are supported there, as a result of which the mounting distance is limited and mutual location is obtained in this direction. The mutual location in the lateral direction at right angles thereto is afforded by the edges 7 of the recesses 8 on the gas tank 2, against which bear the end faces of the U-portions of the arms 4 and 5.

In the construction of the plug-in frame as shown in FIGURES 3 to 6, the recesses 8 on the gas tank 2 and adapted to receive the arms 4 and 5, extend over its whole length, so that continuous edges 7' are formed from top to bottom. Against these bear the associated edges of the U-portion of the arms 4 and 5, as a result of which the lateral position between the plug-in frame and the gas tank is fixed.

In both forms of plug-in frame, in order to ensure the position of the plug-in frame and gas tank in the direction of assembly, inwardly directed projections or beads 6 are provided on the inner faces of the arms 4 and 5 and engage in corresponding depressions 6' in the gas tank. Conversely, of course, the projections, beads or like devices could be provided on the gas tank and engaged in depressions in the inner faces of the arms 4 and 5. In addition to this securing by means of inter-engaging locating means, such as the depressions 6' and beads 6, or simply to limit the assembly distance, the two arms 4 and 5, may, as shown in the embodiment of FIGURES 3 to 6, be connected by means of lateral webs which rest on the top of the gas tank 2 when the plug-in frame 3 is fitted (see FIGURES 3 and 5) and so ensure the mutual position in this direction.

In the embodiment shown in FIGURES 1 and 2, the recesses in the gas tank 2 are formed relatively to the superimposed plug-in frame 3 in such a manner that the two parts produce smooth lateral surfaces in the assembled state so that the casing 10, which is fitted from below, fits closely in place. In the embodiment shown in FIGURES 3 to 6 this is only the case in the area of the arms 4 and 5. Whereas in this example, the ignition mechanism 1 is merely indicated diagrammatically, in the embodiment shown in FIGURES 1 and 2, a rocker 11 can be seen which is mounted on top of the tank at 12 and which is pivoted for actuation of the ignition mechanism to open the gas valve on the gas tank 2. These devices do not form part of the invention.

Changes may be made within the scope and spirit of the appended claims which define what is believed to be new and desired to have protected by Letters Patent.

I claim:

1. A cigarette lighter comprising a cross-sectionally substantially rectangularly shaped gas tank having a wall defining inwardly directed recesses along portions thereof, a frame, an ignition mechanism carried by said frame, and a device for removably mounting said frame with said ignition mechanism on said gas tank, said device comprising means forming two arms extending from said frame and forming a unitary structure therewith for insertion into said inwardly directed recesses, said recesses extending along at least part of the length of said tank and adapted to receive said arms, whereby said arms embrace, in assembled position of said frame with said gas tank, the recessed portions formed along the wall thereof with an edge of each arm disposed in abutment with a corresponding edge of the respective recessed portion, serving to hold said gas tank in defined position with respect to said frame and the ignition mechanism carried thereby.

2. A cigarette lighter according to claim 1, wherein each of said arms is cross-sectionally U-shaped and extends from said frame perpendicularly to the plane of said frame at opposite narrow sides thereof, the wall of said tank being similarly recessed along portions of the opposite narrow sides thereof for receiving said arms with the edges of the U-shaped arms in abutment with edges defined by the respective ends of the recessed portions in the wall of said gas tank.

3. A cigarette lighter according to claim 2, comprising web means carried by said U-shaped arms for engagement with at least part of the surface of the corresponding recessed portions of said gas tank.

4. A cigarette lighter according to claim 2, comprising means formed on at least one of the component parts including the gas tank and said U-shaped arms to provide for interlocking but disengageable engagement therebetween.

5. A cigarette lighter according to claim 1, wherein each of said recesses terminates in a shoulder and each of said arms has an end extending into abutting relationship with said shoulders respectively.

References Cited in the file of this patent

UNITED STATES PATENTS 2,626,517     Ward _____ Jan. 27, 1953

FOREIGN PATENTS 1,067,055     France _____ Jan. 27, 1954